DATA PROCESSING METHOD AND MEANS

Filed June 4, 1964

INVENTOR
JOSEPH R. LEVITT
BY
Jacob Trachtman
ATTORNEY

INVENTOR
JOSEPH R. LEVITT

BY Jacob Trachtman
ATTORNEY

United States Patent Office 3,442,264

Patented May 6, 1969

3,442,264

DATA PROCESSING METHOD AND MEANS

Joseph R. Levitt, 118 Heather Drive, Moorestown, N.J. 07960

Filed June 4, 1964, Ser. No. 372,493
Int. Cl. A61b 5/04
U.S. Cl. 128—2.06 30 Claims The invention relates to data processing method and means, and more particularly to the method and means for processing data to classify and derive information from said data.

Figure 1:
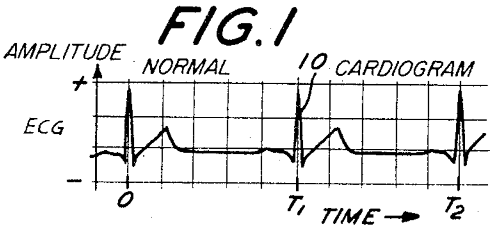

The general problem of establishing the presence or absence of an essential characttristic of a physical system by analyzing the properties of data derived from an active or passive signal received from the system is common to many disciplines, such as radar, sonar, seismography and cardiography In each of these disciplines, the common problem is one of extracting sufficient significant information from a time varying signal from the system, so that a classification of the system into one of several categories may be achieved.

To aid in this classification process, attempts have generally been made to formulate a mathematical model of the physical system in order to acquire an understanding of the basic underlying physical phenomena and the interrelationships between the various physical parameters which constitute the system. Proper interpretation of the data derived from the time varying signal, within the framework of the mathematical model of the system, results in the correct classification of the system.

In many cases, however, the physics of the system is known only imperfectly, the interrelationships between the various physical parameters are ill defined and complex, and a satisfactory mathematical model of the system cannot be formulated. Under such circumstances, proper classification of the data obtained cannot be readily achieved by means of purely analytical approaches.

In contrast to conventional approaches heretofort employed for processing data and signals, I have invented and implemented a new technique for accomplishing classification, which technique is particularly well suited for such disciplines where the physics is imperfectly known.

The principal object of the invention, therefore, is to provide a novel means and method for data processing to determine the classification of data and obtain information about the system from which data are passively or actively derived.

Another object of the invention is to provide a new and improved method and means of data processing for determining the characteristics of a system from which the data is derived which does not require the use of a mathematical model or a partial or complete understanding of tht operation of the system giving rise to the data.

Another object of the invention is to provide a new and improved method and means for data processing which is highly adaptable for use in processing data and signals derived from various types and kinds of systems for determining the condition and state of a system by the use only of the derived data characterizing the system.

Another object of the invention is to provide a new and improved method and means for data processing which may be carried out by hand by the use of various and diverse apparatus and means.

Another object of the invention is to provide a new and improved means for carrying out the method of the invention and differentiating data for determining the classification thereof for indicating the condition of the system which it characterizes.

Anther object of the invention is to provide a new and improved means which easily allows the discrimination between signals of a system to determine quickly and accurately the condition of the system.

Another object of the invention is to provide a new and improved means which allows determination of the condition of a system characterized by data derived therefrom by an operator having minimal training.

The above objects of the invention are achieved by providing a method of data processing comprising the steps of obtaining a set of data characterizing a system in a known first condition, or physical state obtaining a set of data characterizing a system in a known second condition or physical state different from said first condition or state, subjecting the data obtained to a plurality of non-linear coordinate transformations, and selecting the non-linear coordinate transformation of said plurality of transformations which transforms the signals initially obtained, so that the transformed signals characterizing the system in said first condition or state are distinguishable from the transformed signals characterizing the system in said second condition or state. The method may also include the further step of subjecting data characterizing a system in either the first or second conditions or states to the selected transformation for determining the condition or state of the system.

More particularly, the method of data procesing for determining the condition or physical state of a system characterized by the time varying signal comprises the following steps. A set of time varying signals characterizing systems under consideration in a known first condition or state is obtained and a set of time varying signals characterizing said systems in a known second condition or state different from said first condition or state which are not obviously distinguishable from the signals obtained in the first step is obtained. The time varying signals obtained in the first and second steps are subjected to a plurality of non-linear cordinate transformations. A non-linear transformation is one which transforms a line into a form other than another line. A non-linear coordinate transformation of said plurality of transformations of the preceding step is selected which transforms the signals obtained through the first and second steps into a transformed two coordinate plane distinguishing signals characterizing systems of said first condition or state from signals characterizing systems in said second condition or state. The method further includes the steps of defining first and second regions of said transformed plane by use of said signals obtained in said first and second steps after being subjected to the selected transformations of the step preceding the present step, for characterizing transformed signals derived from systems in unknown first and second conditions or states, as being from systems respectively in said first and second conditions or states when contained respectively in said first and second regions.

The method may also contain more particularly the additional step in which the transformed signals are normalized for defining said first and second regions and the step of determining the locations of transformed signals from systems in unknown first and second conditions or states subjected to the selected transformation for establishing whether such systems with unknown conditions or states are in said first and second conditions or states. By normalizing such signals they can be processed and compared more readily since the maximum coordinate values of the transformed signals are preset as more fully explained in the description of the invention given below in connection with cardiography.

The invention and method may also be carried out by the steps of obtaining data from a system in either a first or second condition or state, transforming the data obtained in the first step by a non-linear transformation which differentiates said data into either a first or second class corresponding respectively to the first and second conditions or states of said system, and determining whether said transformed data are in the first or second condition or state for establishing whether the system from which data is obtained is in the first or second condition or state.

In more specific form, the above method of the invention is carried out for determining the condition or state of the system characterized by a time varying signal by the steps of obtaining a time amplitude varying signal characterizing a system in either the first or second condition or state given by $S=S(t)$, transforming the time varying signal S($t$) of the first step by transformation into a plane of coordinates $f$ and $g$ defined by the form:

$$f=P_1\int_0^T Sdt$$

$$g=P_2\int_0^T\int_0^T Sdtdt$$

where $P_1$ and $P_2$ are normalizing factors and T is the period of S and the $g$, $f$ plane has region or bounded areas corresponding to the first and second conditions or states of the first step, and determine the location of said transformed signal in the transformed plane with respect to said first and second regions for establishing whether the system of the first step is in said first or second condition or state.

The method of the invention is carried out by data processing means comprising input means for receiving time varying signals characterizing the condition or physical state of a system, first processing means integrating signals received from said input means and delivering a first output signal, second processing means integrating first output signals received from said first processing means and delivering a second output signal, and third means receiving said first and second output signals and providing a third output signal for indicating the condition or physical state of said system. The data processing means may include means for respectively normalizing said first and second output signals as well as sequencing means for delivering said output signals during times corresponding to predetermined periods of the signal received by said input means.

The particular form of the third means disclosed comprises a cathode ray tube with a face portion having first and second regions or bounded areas indicating the condition of the system characterized by the signal received by the input means, the first region being translucent, while said second region is transparent. The data processing means may also include detecting means having photosensitive means for determining the condition or state of the system characterized by the signal received by the input means.

The invention is particularly described herein in relation to cardiology, wherein the systems under consideration are human subjects and the first and second conditions or physical states are respectively normal and non-normal cardiographic signals derived from said subjects. Of course when the invention is applied to radar the systems could be flying objects and the first and second conditions or states could be considered as the presence or absence of flying objects of a particular form and size at a particular location, as an example.

Figure 2:
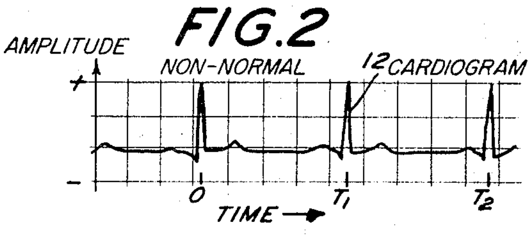
Figure 3:
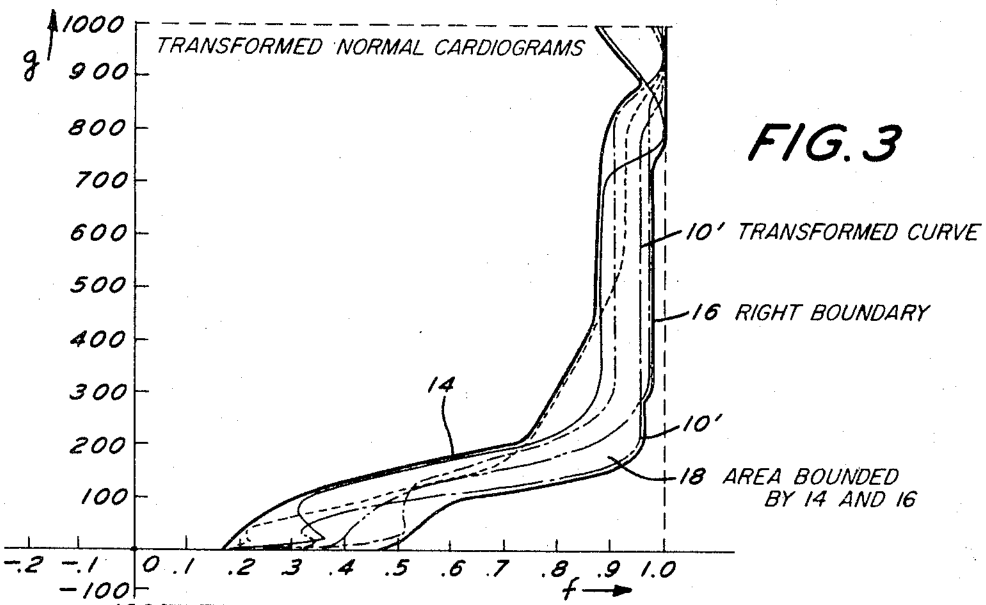
Figure 4:
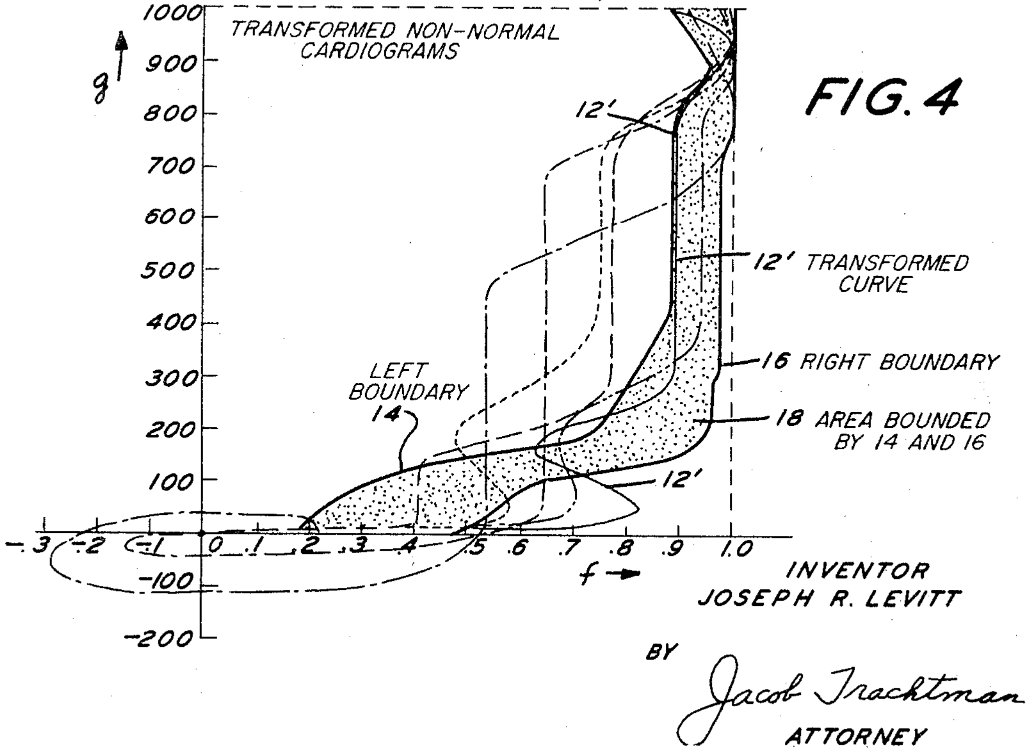

The foregoing and other objects of the invention will become more apparent as the following detailed description of the invention is read in conjunction with the drawings, in which:

FIGURE 1 is a graphic representation of data in the form of a time varying signal known as a cardiogram characterizing the cardiac condition of a subject constituting one of a group of many cardiograms characterized as normal, FIGURE 2 is a graphic representation of data derived from a subject known as a cardiogram characterizing the condition of the subject and being one of many such graphs characterized as non-normal with respect to the group of cardiograms represented by the cardiogram of FIGURE 1, FIGURE 3 is a graphic representation of a plurality of curves derived from the group of cardiograms which includes the cardiogram of FIGURE 1 after having been transformed by a non-linear transformation into the $g$, $f$ plane, FIGURE 4 is a graphic representation of a plurality of curves derived from the group of cardiograms which includes the cardiogram of FIGURE 2 after having been transformed by a non-linear transformation into the $g$, $f$ plane.

Figure 5:
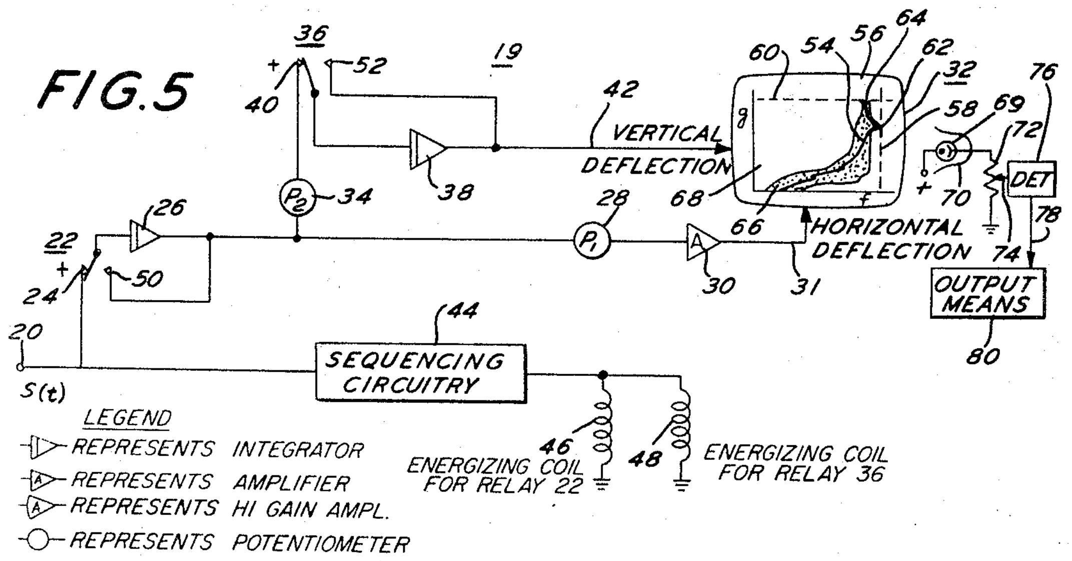
Figure 6:
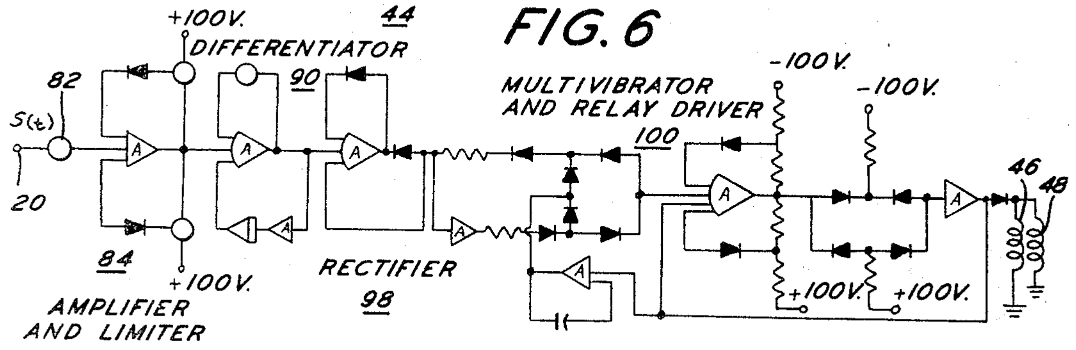

FIGURE 5 schematically illustrates an apparatus for performing a method of the invention, FIGURE 6 is a schematic diagram of the sequencing circuitry shown in block form in FIGURE 5, and FIGURES *7a, 7b, 7c* and *7d* are graphic illustrations of waveforms generated by the circuitry of FIGURE 6.

Like reference numerals designate like parts throughout the several views.

Although the method of the invention may be used in various arts including radar, sonar, seismography, cardiography and other arts, the method will be particularly described herein in connection with the use of data obtained from animate subjects by means such as cardiography.

In this connection, FIGURE 1 graphically represents as a function of time a periodic signal 10 varying in amplitude derived from an animate subject in the form of a cardiogram. The cardiogram is shown to be cyclic in nature, several periods beginning and ending at 0, $T_1$ and $T_2$ being illustrated in FIGURE 1. The cardiogram illustrated in FIGURE 1 is derived from and is one of a group of fourteen actual cardiograms. The group of fourteen cardiograms, each taken of a respective animate subject, namely human subjects, and in connection with which the method of the invention is described and illustrated herein, have been a priori determined to be and, for the purpose of this illustration, are classified as normal cardiograms.

Similarly, FIGURE 2 graphically represents an amplitude time varying function 12, also depicted as cyclic in nature and showing several periods beginning and ending at 0, $T_1$ and $T_2$. The cardiographic signal 12, which is one of a group of fourteen cardiograms taken of animate human subjects, is representative of and particularly characterized a priori for the purpose of illustrating the method as non-normal cardiograms.

The first and second classifications of the respective normal and non-normal cardiograms are taken as known for the purpose of the method and may be thus characterized by a knowledge of the subject attained by the study of the history before and/or after the taking of the cardiograms of the animate subject. Thus, the two groups of normal and non-normal cardiograms, as thus classed, are not distinguished or classified necessarily by an examination of the cardiograms as presented. However, the classification of the cardiograms into groups or different classes may be achieved by any desired means and the cardiograms, as thus classified, are used in carrying out the method as further described herein.

In order to differentiate or distinguish between the data in one classification and the data in another classification, the data which, in this case, comprise the cardiograms represented by the groups of which FIGURES 1 and 2 show a single respective cardiogram, are subjected to a transformation of the following form:

$$f=\int S^m dt$$
$$g=\int\int S^n dtdt$$

for transformation to a $g$, $f$ two dimensional plane.

The exponent $m$ and $n$ are so chosen that a transformation of the data results, in which the data of one classification can readily be distinguished from transformed data of the other classification. A satisfactory transformation for the cardiogram data of which FIGURES 1 and 2 represent individual members of respective groups of normal and non-normal cardiographic information, is found to have the form $$f=\int Sdt$$
$$g=\int\int Sdtdt$$

for the purpose of the method. The transformed data were normalized to provide a maximum value of 1 (the number "one") for the $f$ coordinate and a maximum value of 1,000 for the $g$ coordinate of the transformed data. In order to provide such normalization, the transformation coordinates for the transformed data are defined by the form $$f=P_1\int_0^T Sdt$$

$$g=P_2\int_0^T\int_0^T Sdtdt$$

$P_1$ and $P_2$ are normalizing factors and T is the period of S, the transformed cardiographic signal.

Solving the above equations for $P_1$ and $P_2$ gives the respective expressions $$P_1=\frac{f}{\int_0 TSdt}$$

$$P_2=\frac{g}{\int_0^T\int_0^T Sdtdt}$$

It is noted that the values of $P_1$ and $P_2$ depend upon the set of data or information signal S being processed and therefore may change with each set of data or each information signal processed.

With $f$ set equal to 1 and $g$ set equal to 1,000 for normalizing purposes the above expressions reduce to $$P_1=\frac{1}{\int_0^{t_1} Sdt}$$

$$P_2=\frac{1000}{\int_0^T\int_0^T Sdtdt}$$

where $t_1$ in the expression for $P_1$ is taken to be the time $t$ when the integral in the denominator has a maximum value. Normalization in this manner corresponds to the particular normalization of the transformed curves illustrated in FIGURES 3 and 4 and the normalization described below in connection with the operation of the apparatus of FIGURES 5 and 6 carrying out the method of the invention.

FIGURE 3 is a graphic representation in the $g$, $f$ plane of a selected plurality of the said fourteen cardiograms, of which cardiogram 10 of FIGURE 1 is classified as normal, while FIGURE 4 shows curves in the $g$, $f$ plane of a selected group of said cardiograms characterized as non-normal of the fourteen graphs including in its group the cardiogram 12 of FIGURE 2.

The cardiographic signal 10 is shown transformed into the g, $f$ plane of FIGURE 3 as a dashed and dotted line 10', while the cardiographic signal 12 of FIGURE 2 is shown as the curve 12' in FIGURE 4 when transformed into the $g$, $f$ plane, using the transformation in which $m$ and $n$ are equal to 1. The selected non-linear transformation for transforming the cardiographic signals into the $g$, $f$ plane and obtaining sufficient discrimination and differentiation between them to determine separate classification is illustrated by FIGURES 3 and 4. An envelope illustrated by the dark lines 14 and 16 is drawn about the curves of the transformed data characterized as normal cardiographic signals and contain the curves of each of the fourteen normal cardiograms therein. No portion of the transformed data extends outside of the boundary formed between the curves 14 and 16 which are drawn expressly for the purpose of containing the curves within a restricted region. Only five of the forteen curves are shown in FIGURE 3 for the purpose of clarity.

Thus, in observing the bounded region 18 forming an area strip within the curves 14 and 16, it is noted that the selected transformation is effective in restricting and providing transformed curves for the data of the normal cardiographic signals within a highly narrow and limited area or region. The bounding lines 14 and 16 of the strip 18 are transferred to the $g$, $f$ plane of FIGURE 4 for indicating the region in which the normal curves for the selected cardiographic data are confined. The transformation of the cardiographic signals classified as non-normal data shows that some portion, in many cases large portions of the transformed curves, lie wholly outside the region 18 within which the normal curves are entirely restricted. Thus, the non-normal transformed data is readily differentiated and distinguished from normal data by the selected transformation $$f=P_1\int_0^T Sdt$$

and $$g=P_2\int_0^T\int_0^T Sdtdt$$

With the submission of further cardiographic data in the form of cardiograms of the type which have been classified by the method illustrated in FIGURES 3 and 4, the graph of the transformed data is plotted and the classification determined by the position of the transformed data of the unknown signal with respect to the region 18 illustrated in FIGURE 3. If the transformed curve lies within the region 18, the data is classified as being in the group of normal cardiographic signals. On the other hand, if the data is transformed into the second region outside of the region 18, then such data is clearly classified as in the group of non-normal signals. In the case where a significant portion of the signal, as in the case of the transformed signal 12', lies outside of the region 12 even though the remaining portion of the signal lies within the region 12, the signal is classified as belonging to the non-normal group of signals.

In connection with the cardiographic information utilized, it is noted that standard cardiograms were obtained, using data derived from the standard lead number 2 (sometimes referred to as lead number 11), a designation well known in the art. The initiation of the signal processing commenced with the Q wave, a designation well known in the electrocardiographic art, for the purpose of producing the graphs in FIGURES 3 and 4. It is noted that the use of the method, however, is not limited to the use of a particular lead of cardiographic producing equipment or the point of initiation of the period of the signal data, and that the method may be used for other leads for classification of corresponding groups of cardiograms into normal and non-normal classes as well as the use of the method with entirely unrelated systems, such as in connection with radar, sonar and seismography, system failure detection, as examples.

From the above, it is noted that the method may readily be carried out by hand and the following is an illustration of one of many means which may be employed to classify data, in this particular illustration, cardiographic signals into normal or non-normal classifications. For this purpose, refer to FIGURE 5 which schematically illustrates signal processing apparatus 19 having an input terminal 20 receiving amplitude time varying cardiographic signals 86 of FIGURE 7$a$ and similar to those illustrated in FIGURES 1 and 2. The cardiographic signals 86 have a cyclic nature and constitute information having a period T. An input signal 86 which is a function of time and designated as $S(t)$ and is an amplitude varying voltage, is delivered through a relay 22 having its armature energized for engaging its contact 24 to the input of an integrator 26. The signal delivered by the output of the integrator 26 is delivered through a potentiometer 28 to the input of an amplifier 30 which delivers a signal to its output lead 31 for energizing the horizontal deflection plates of a cathode ray display tube 32.

The signal from the output of the integrator 26 also passes through a second potentiometer 34 and a relay 36 to the input of a second integrator 38. The relay 36 at this time is energized for having its armature engaging its contact 40 for delivering the input signal to the integrator 38. The double integrated signal derived from signal $S(t)$ at the input terminal 20 is delivered at the output of the integrator 38 to the lead 42 which connects with the vertical deflection plates of the cathode ray display tube.

The sequencing circuitry 44 activates the coils 46, 48 respectively of the relays 22, 36 during one period of the cardiographic signal being received at the input terminal 20. During the following period, the coils 46, 48 are deactivated, resulting in the relays 22, 36 being de-energized and having their armatures respectively engaging their alternate contacts 50, 52. In such a de-energized state, the relays 22, 36 disconnect the integrators 26, 38 from their sources of input signals and have their outputs shorted to their inputs discharging the integrators 26, 38 and readying them for another integration during the next period of the input signal at terminal 20. Thus, the lines 31, 42 deliver deflection signals concurrently to the cathode ray tube 32 during alternate periods of the input signal 86, thereby allowing time for the discharge of the integrators 26, 38 between integrations.

When a particular cardiographic signal is being received by the apparatus 19 at its terminal 20, a curve 54 is displayed on the cathode ray tube face 56 of the standard type cathode ray display tube 32. The face of the tube 56 provides a plane with $g$ and $f$ coordinates along the vertical and horizontal lines shown thereon. To normalize the curve 54 in the manner discussed above in the application of the method in FIGURES 3 and 4 of the transformed data, the potentiometer 28 is adjusted so that the curve 54 has a maximum portion just tangent to the vertical line 58 as shown at 62. Similarly, the potentiometer 34 is adjusted so that the maximum value of the vertical deflection provides a curve with a maximum value limited by the horizontal line 60 as at 64.

The face 56 of the cathode ray tube 32 is provided with a screen containing a translucent region 66 corresponding to the region 18 in FIGURES 3 and 4 and a transparent region 68 which lies outside of the translucent region 66.

In this manner, the portion of the curve 54 which lies within the translucent region 66 can be visibly seen, while the portion of the curve which lies outside of this region and in the transparent region 68, is much brighter and has a much higher light intensity.

The human observer, thus, may readily determine the classification of the incoming signal delivered to the terminal 20 by observation of the curve 54 for determining whether same lies entirely within the region 66 or whether a significant portion lies outside of the region 66 and in the region 68. In this way, the screen assists in respectfully determining whether the curve is either in the normal or in the non-normal classification.

In order to remove the human element and allow automatic determination of classification of the input signal $S(t)$ delivered to the apparatus of the terminal 20, a photoelectric cell 69 is provided which is directed by shield 70 to receive light generated by the tube 32 producing the curve 54.

The photoelectric cell 69 has its anode connected to positive potential and its electron emitting cathode returned to ground potential through a potentiometer 72 having a positionable contact 74. The signal derived from the contact 74 of the potentiometer is received by a signal level detector 76 which delivers an output signal over line 78 to an output means 80 whenever the signal is above a predetermined level. The output means 80 may be a digital recording means, or a signaling means such as a light or buzzer for indicating the classification into normal or non-normal classes of the signal being processed. The positionable contact 74 of the potentiometer 72 is adjusted so that when a curve 54 displayed upon the face 56 of the cathode display tube 32 is within the translucent area 66, the level of the light received by the photoelectric cell 69 provides a signal which is below the level required by the detector 76 for delivery of an output signal over the line 78 to the output means 80. However, when a significant portion of the curve 54 lies outside of the translucent region 66 and in the transparent region 68 of the cathode ray tube face 56, the level of the received light detected by the photoelectric cell 69 is sufficiently high to deliver a signal having an amplitude above the threshhold value of the detector 76. This results in the delivery of an output signal by the detector 76 over the line 78 to the output means 88 for indicating the classification of the signal within the non-normal group.

Refer to FIGURE 6 which discloses in schematic form and in greater detail the sequencing circuitry 44 of the apparatus 19 shown in FIGURE 5.

Figures 7A, 7B, 7C, 7D:
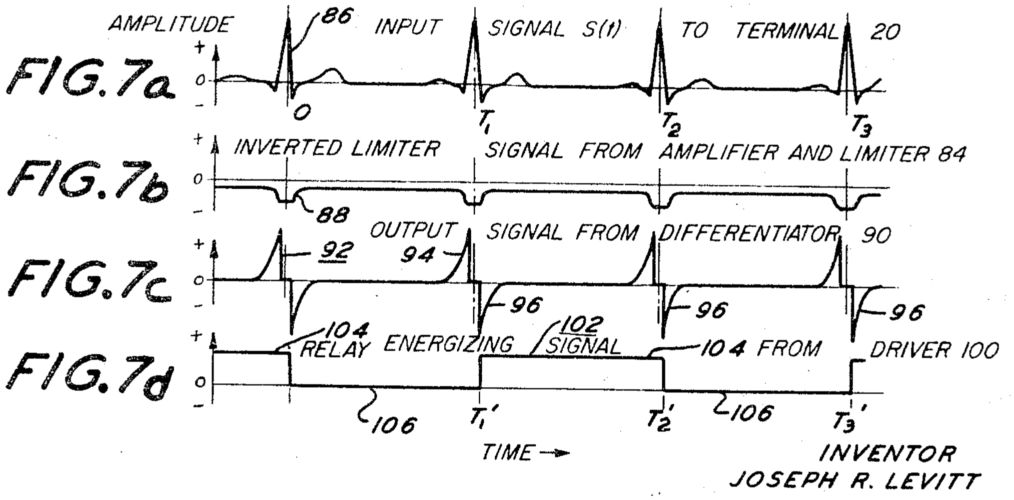

The sequencing circuitry 44 receives signals from the input terminal 20 through a potentiometer 82 which allows adjustment of the level of the input signal required for the amplifier limiter 84. The received signals, such as the time amplitude varying cardiographic signals 86 delivered to the input terminal 20, are shown in FIGURE 7*a*. The cyclic nature of the input signals, with cycles beginning and ending at $T_1$, $T_2$ and $T_3$, is readily illustrated in FIGURE 7*a*. The amplifier and limiter circuit 84 which is of standard configuration provides the inverted amplified and limited signal 88 shown in FIGURE 7*b*. The signals 88 are delivered by the amplifier limiter circuit 84 to the differentiator circuit 90 which is also of standard construction and which differentiates the signal 88 producing the signal 92 having positive and negative components respectively 94, 96, graphically shown in FIGURE 7*c*.

The signal 92 from the differentiator 90, is delivered to the rectifier circuit 98, of standard configuration, which produces an output signal containing only the negative components 96 shown in FIGURE 7*c* of the signal 92. The negative output signal 92 is delivered to the multivibrator relay driver 100 of a standard configuration which delivers a square wave signal 102 for energizing the coils 46 and 48 respectively of the relays 22, 36 of FIGURE 5. The square wave signal 102 has an alternating positive portion 104 and a zero portion 106. Each portion 104, 106 has the duration of one period T of the incoming cardiographic signal $S(t)$.

Upon the occurrence of the positive portions 104 of the signal 102, the relays 22, 36 are energized for respectively engaging their contacts 24, 40 for delivering input signals respectively to the integrators 22 and 36, while during the alternate zero amplitude periods 106, the relays are de-energized to engage their alternate contacts 50, 52 for discharging the integrators 26, 36 and preparing them for concurrent integration operations during the next succeeding period.

The method and apparatus illustrated and described in detail above relate to the processing of signals characterizing the condition of a system and cardiographic signals in particular have been treated. In general, the method and apparatus may readily be applied in connection with radar, sonar, seismographic and other such data susceptible to being distinguished by non-linear transformation of the data by appropriate formula as taught above.

The aforesaid disclosure of method and means is illustrative only and should not be construed as limiting the spirit and scope of the invention defined by the following annexed claims.

What is claimed is:

1. A method of data processing comprising the steps of:
(a) obtaining data from a system in either a first or second physical state,
(b) transforming the data obtained in step (a) by a non-linear transformation which differentiates said data into either a first or second class corresponding respectively to the first and second physical states of said system,
(c) and indicating whether said transformed data of step (b) are in the first or second class defined by step (b) for establishing whether the system of step (a) is in said first or second state, 2. A method of signal processing for determining the physical state of a system characterized by a time varying signal which comprises the steps of:
(a) obtaining a time varying signal characterizing a system in either a first or second physical state,
(b) transforming the time varying signal obtained in step (a) by a non-linear coordinate transformation which transforms said signal into defined first or second classes corresponding to the first and second physical states of step (a),
(c) and determining whether said transformed signal of step (b) is in the first or second class defined by step (b) for establishing whether the system of step (a) is in said first or second state.

3. A method of signal processing for determining the physical state of a system characterized by a time varying signal which comprises the steps of:
(a) obtaining a time-amplitude varying signal characterizing a system in either a first or second physical state,
(b) transforming the time varying signal obtained in step (a) by a non-linear coordinate transformation into a transformed two coordinate plane having first and second regions corresponding to the first and second physical states of step (a),
(c) and determining the location of said transformed signal of step (b) in the transformed coordinate plane with respect to said first and second regions for establishing whether the system of step (a) is in said first or second state.

4. A method of signal processing for determining the physical state of a system characterized by a time varying signal which comprises the steps of:
(a) obtaining a time-amplitude varying signal characterizing a system in either a first or second physical state given by $S=S(t)$,
(b) and transforming the time varying signal of step (a) by a transformation into a plane with coordinates $f$ and $g$ defined by the form $$f=\int S^m dt$$
$$g=\int\int S^n dtdt$$

where $m$ and $n$ are respective predetermined exponential values of S and said $f$, $g$ plane has regions corresponding to the first and second physical states of step (a).

5. The method of claim 4 including the step of:
(c) determining the location of said transformed signal of step (b) in the transformed plane with respect to said first and second regions for establishing whether the system of step (a) is in said first or second state.

6. A method of signal processing for determining the physical state of a system characterized by a time varying signal which comprises the steps of:
(a) obtaining a time-amplitude varying signal characterizing a system in either a first or second physical state given by $S=S(t)$,
(b) transforming the time varying signal $S=S(t)$ of step (a) by a transformation into a plane with coordinates $f$ and $g$ defined by the form $$f=P_1\int_0^T Sdt$$
$$g=P_2\int_0^T\int_0^T Sdtdt$$

where $P_1$ and $P_2$ are normalizing factors and T is the period of S and said $f$, $g$ plane has regions corresponding to the first and second physical states of step (a),
(c) and determining the location of said transformed signal in the transformed plane with respect to said first and second regions for establishing whether the system of step (a) is in said first or second state.

7. The method of claim 6 in which the time varying signal of step (a) is an electro-cardiographic signal of a subject and the first and second physical states of said system characterized by said signal are a normal cardiac condition and a non-normal cardiac condition.

8. A method of data processing for determining the cardiac condition of a subject characterized by cardiographic data which comprises the steps of:
(a) obtaining cardiographic data from a subject with either a normal or non-normal cardiac condition,
(b) transforming the data obtained in step (a) by a non-linear transformation which differentiates said data either into a first or second class corresponding to said normal and non-normal condition of said subject,
(c) and determining whether said transformed data of step (b) is in the first or second class defined by step (b) for establishing whether the subject of step (a) has a normal or non-normal cardiac condition.

9. A method of data processing for determining the cardiac condition of a subject characterized by electro-cardiographic data which comprises the steps of:
(a) obtaining electro-cardiographic data from a subject with either a normal or non-normal cardiac condition,
(b) transforming the data obtained in step (a) by a non-linear coordinate transformation into a transformed two coordinate plane having first and second regions correspondnig to the normal and non-normal cardiac condition of step (a),
(c) and determining the location of said transformed signal of step (b) in the transformed coordinate plane with respect to said first and second regions for establishing whether the subject of step (a) has a normal or non-normal cardiac condition.

10. A method of signal processing for determining the cardiac condition of a subject characterized by a time varying electro-cardiographic signal which comprises the steps of:
(a) obtaining a time-amplitude varying electro-cardiographic signal of a subject characterizing either a normal or non-normal cardiac condition given by $S=S(t)$,
(b) and transforming the signal of step (a) by a transformation into a plane with coordinates $f$ and $g$ defined by the form $$f=\int S^m dt$$
$$g=\int\int S_n dtdt$$

where $m$ and $n$ are respective predetermined exponential values of S and said $f$, $g$ plane has regions corresponding to normal and non-normal cardiac conditions of step (a).

11. The method of claim 10 which includes the step of:
(c) determining the location of said transformed signal of step (b) in the transformed plane with respect to said first and second regions for establishing whether the subject of step (a) has a normal or non-normal cardiac condition.

12. The method of claim 10 in which $m$ and $n$ are each respectively equal to 1 and the integrals defining the coordinate values of $f$ and $g$ for the transformed signals are integrated over a period T of said electro-cardiographic signal of step (a).

13. A method of data processing comprising the steps of:

(a) obtaining a first set of data from a system in a known first physical state, (b) obtaining a second set of data from a system in a known second physical state in which state the obtained data is not obviously distinguishable from the data obtained in step (a), (c) subjecting the data obtained in steps (a) and (b) above to a plurality of non-linear transformations, (d) and selecting a non-linear transformation of said plurality of transformations of step (c) which results in transformed data which distinguishes the data of step (a) from the data of step (b).

14. The method of claim 13 including the step of:

(e) subjecting data obtained from systems in either said first physical state of step (a) or said second physical state of step (b) to said selected transformation for determining whether the system from which said data is obtained is in said first or second states.

15. A method of signal processing for determining the physical state of a system characterized by a time varying signal which comprises the steps of:

(a) obtaining a set of time varying signals characterizing systems in a known first physical state, (b) obtaining a set of time varying signals characterizing systems in a known second physical state different from said first state which are not patentably distinguishable from the signals obtained in step (a), (c) subjecting the time varying signals obtained in steps (a) and (b) to a plurality of non-linear coordinate transformations.

(d) and selecting a non-linear coordinate transformation of said plurality of transformations of step (c) which transforms said signals obtained in steps (a) and (b) so that the transformed signals characterizing systems in said first state are distinguishable from the transformed signals characterizing systems in said second state.

16. The method of claim 15 including the step of:

(e) subjecting a time varying signal characterizing a system in either the first or second physical states to said selected transformation of step (d) for determining the physical state of said system.

17. A method of data processing for determining the physical state of a system characterized by a time varying signal which comprises the steps of:

(a) obtaining a set of time varying signals characterizing systems in a known first physical state, (b) obtaining a set of time varying signals characterizing systems in a known second physical state different from said first state which are not obviously distinguishable from the signals obtained in step (a), (c) subjecting the time varying signals obtained in steps (a) and (b) to a plurality of non-linear coordinate transformations, (d) selecting a nonlinear coordinate transformation of said plurality of transformations of step (c) which transforms the signals obtained in steps (a) and (b) into a transformed two coordinate plane distinguishing signals characterizing systems in said first state from signals characterizing systems in said second state, (e) and defining first and second regions of said transformed plane from said signals obtained in steps (a) and (b) and subjected to the selected transformation of step (d) for characterizing transformed signals contained respectively therein from systems with unknown first and second physical states as obtained from systems respectively in said first and second states.

18. The method of claim 17 in which said transformed signals of steps (a) and (b) are normalized for defining said first and second regions in step (e) and the further step of:

(f) determining the locations of transformed signals from systems with unknown first and second conditions of steps (a) and (b) subjected to the selected transformation of step (d) for establishing whether such systems with unknown conditions are in said first or second physical states.

19. A method of data processing for determining the physical state of a system characterized by a time varying signal which comprises the steps of:

(a) obtaining a set of time varying signals characterizing systems in a known first physical state, (b) obtaining a set of time varying signals characterizing systems in a known second physical state different from said first condition which are not obviously distinguishable from the signals obtained in step (a), (c) subjecting the time varying signals obtained in steps (a) and (b) to a non-linear transformation which transforms the signals obtained in steps (a) and (b) into a transformed two coordinate plane distinguishing signals characterizing system in said first state from signals characterizing systems in said second state.

(d) and defining first and second regions of said transformed plane from said signals obtained in steps (a) and (b) and subjected to the selected transformation of step (c) for characterizing transformed signals contained respectively therein from systems with unknown first and second states as obtained from systems respectively in said first and second physical states.

20. The method of claim 19 in which said transformed signals of steps (a) and (b) are normalized for defining said first and second regions in step (d) and the further step of:

(e) derermining the locations of transformed signals from systems with unknown first and second physical states of steps (a) and (b) subjected to the selected transformation of step (c) for establishing whether such systems with unknown conditions are in said first or second physical states.

21. A data processing means comprising input means for receiving time varying signals characterizing the physical state of a system, first processing means integrating signals received from said input means and delivering a first output signal, second processing means integrating first output signals received from said first processing means and delivering a second output signal, and third means receiving said first and second output signals and providing a third output signal for indicating the physical state of said system.

22. The means of claim 21 including means for respectively normalizing said first and second output signals.

23. The means of claim 22 including sequencing means for delivering said output signals during times corersponding to predetermined periods of the signal received by said input means.

24. The means of claim 23 in which said third means comprises a cathode ray tube with a face portion having first and second regions for indicating the physical state of a system characterized by the signal received by said input means.

25. The means of claim 24 in which said first region is translucent and said second region is transparent, and includes detecting means including photosensitive means for determining the physical state of a system characterized by the signal received by said input means.

26. A data processing means for determining the cardiac condition of a subject characterized by electro-cardiographic signals comprising input means for receiving the electro-cardiographic signal from a subject, first processing means integrating signals received from said input means and delivering a first output signal, second processing means integrating first output signals received from said first processing means and delivering a second output signal, and third means receiving said first and second output signals and providing a third output signal for indicating the cardiac condition of said subject.

27. The means of claim 26 including means for respectively normalizing said first and second output signals.

28. The means of claim 27 including sequencing means for delivering output signals during times corresponding to predetermined periods of the signal received by said input means.

29. The means of claim 28 in which said third means comprises a cathode ray tube with face portions having first and second regions for indicating the cardiac condition of a subject characterized by the cardiac signal received by said input means.

30. The means of claim 29 in which said first region is translucent and said second region is transparent, and includes detecting means including photosensitive means for determining the condition of a subject characterized by the cardiac signal received by said input means.

References Cited

UNITED STATES PATENTS

| | | | |
|---|---|---|---|
| 3,087,487 | 4/1963 | Clynes | 128—2.1 |
| 3,215,136 | 11/1965 | Holter et al. | 128—2.06 |
| 3,229,687 | 1/1966 | Holter et al. | 128—2.06 |
| 3,267,933 | 8/1966 | Mills et al. | 128—2.06 |
| 3,267,934 | 8/1966 | Thornton | 128—2.06 |
| 2,150,223 | 3/1939 | Hollmann | 128—2.06 |
| 2,409,749 | 10/1946 | Foulger et al. | 128—2.06 |
| 2,646,465 | 7/1953 | Davis et al. | |
| 2,660,165 | 11/1953 | Mill | 128—2.06 |
| 2,866,899 | 12/1958 | Busignies et al. | |
| 2,965,876 | 12/1960 | Mewnier et al. | |
| 2,983,880 | 5/1961 | McFadden. | |
| 2,991,469 | 7/1961 | McCurdy. | |
| 2,998,568 | 8/1961 | Schlessel | 324—77 |
| 3,030,946 | 4/1962 | Richards | 128—2.06 |
| 3,096,434 | 7/1963 | King. | |

RICHARD A. GAUDET, *Primary Examiner.*

K. L. HOWELL, *Assistant Examiner.*

U.S. Cl. X.R.

235—151, 181